April 8, 1969   W. S. COBLENTZ ET AL   3,437,174
MOBILE PLATFORM CONSTRUCTION
Filed Nov. 10, 1966
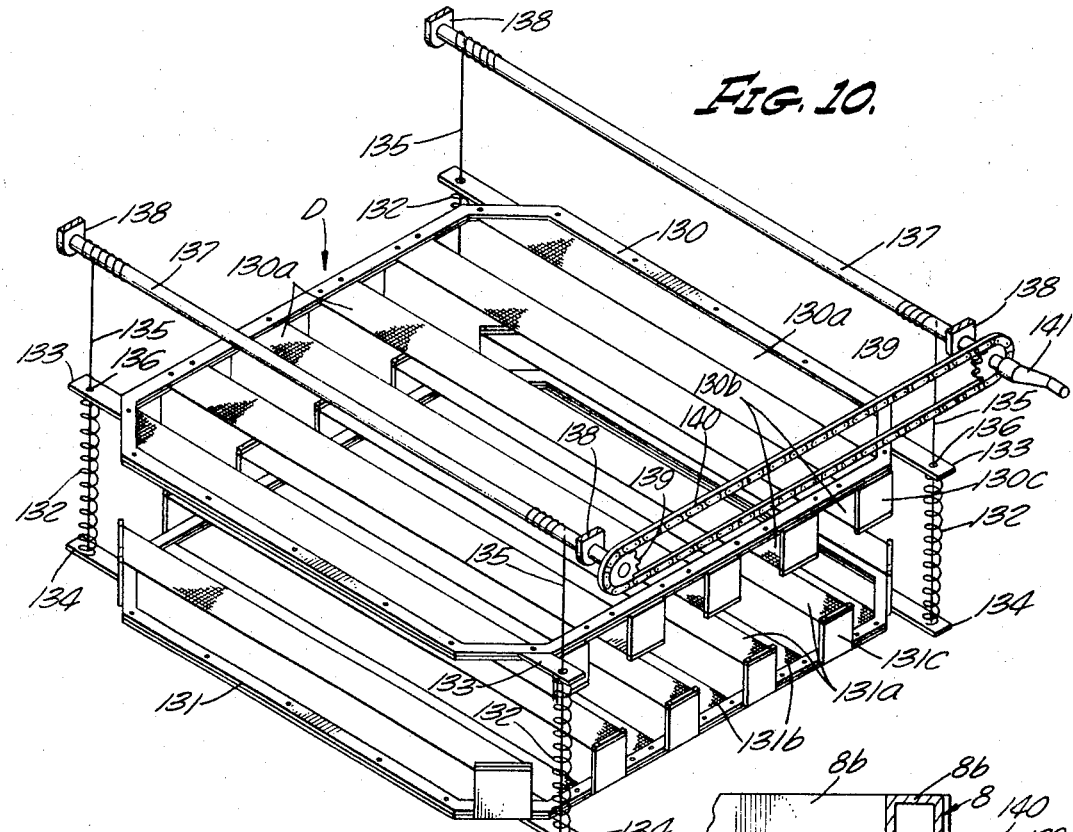
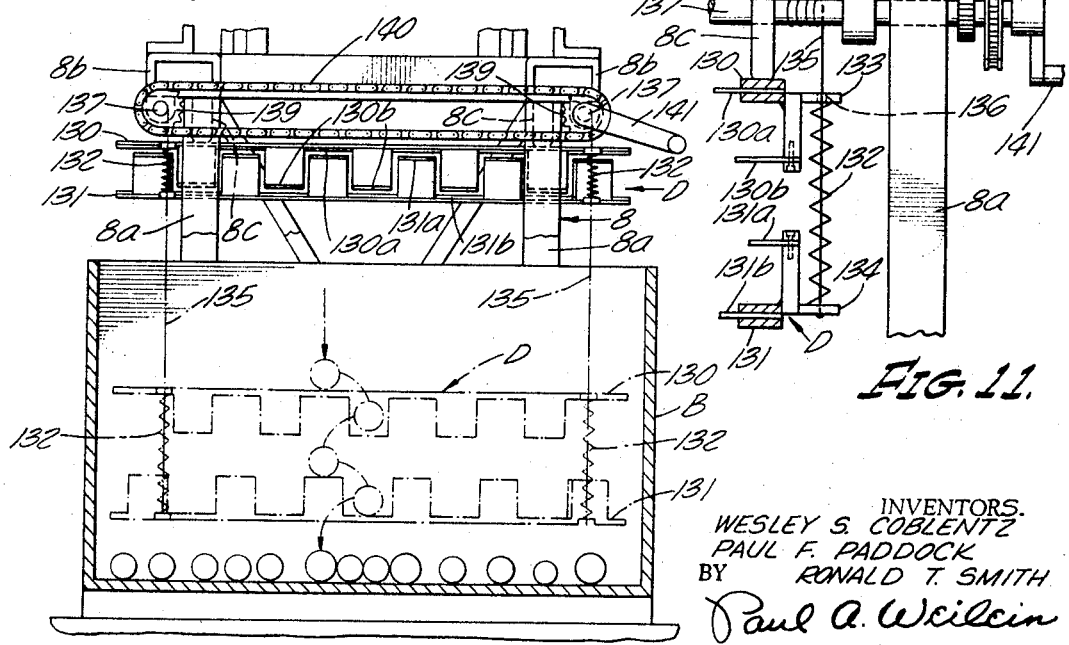
INVENTORS.
WESLEY S. COBLENTZ
PAUL F. PADDOCK
RONALD T. SMITH
BY Paul A. Weilein
ATTORNEY A further object is to provide such a combined support and movable platforms wherein the platforms are disposed at different elevations so as to allow pickers to simultaneously work in zones of different elevation.

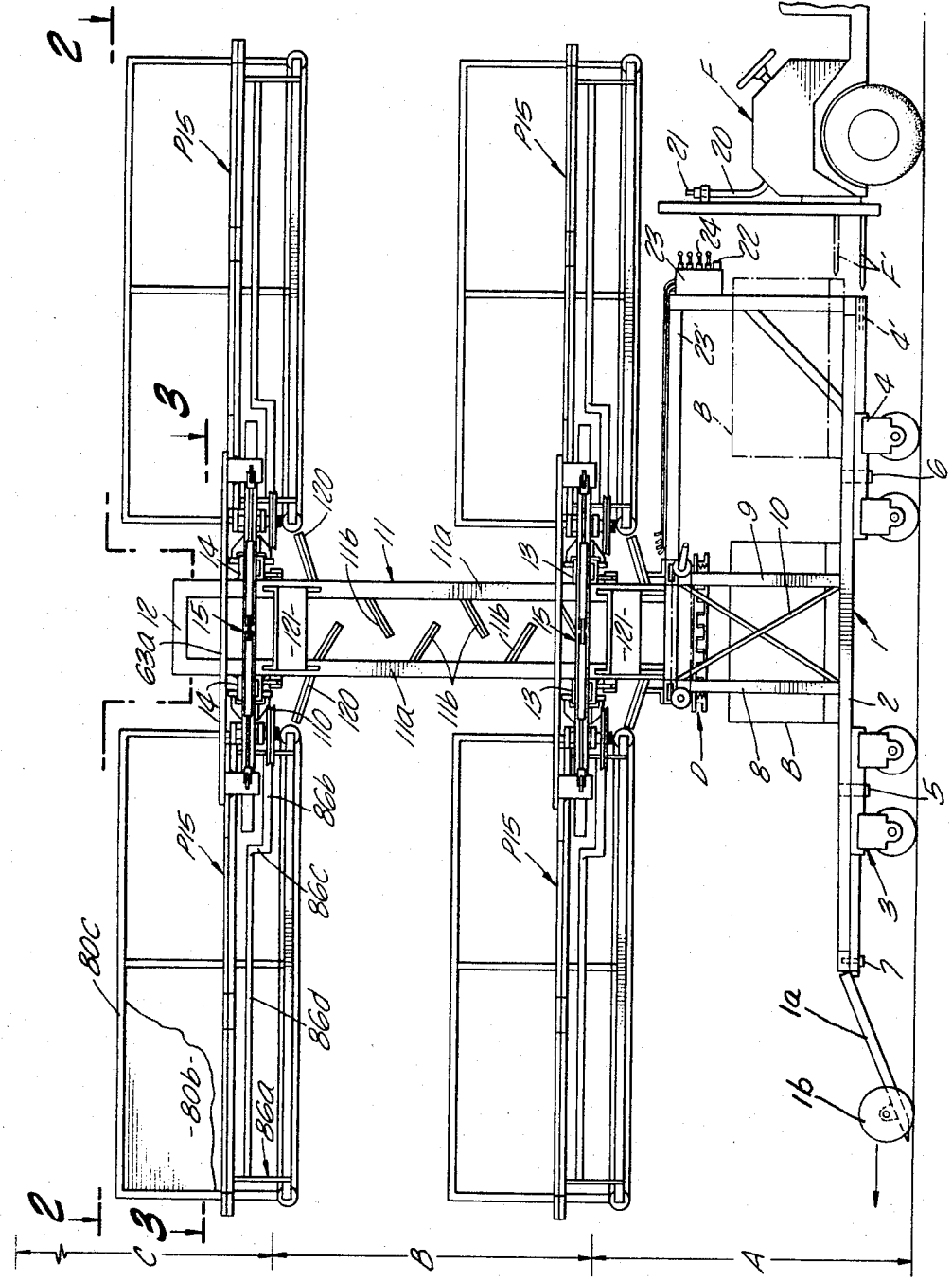

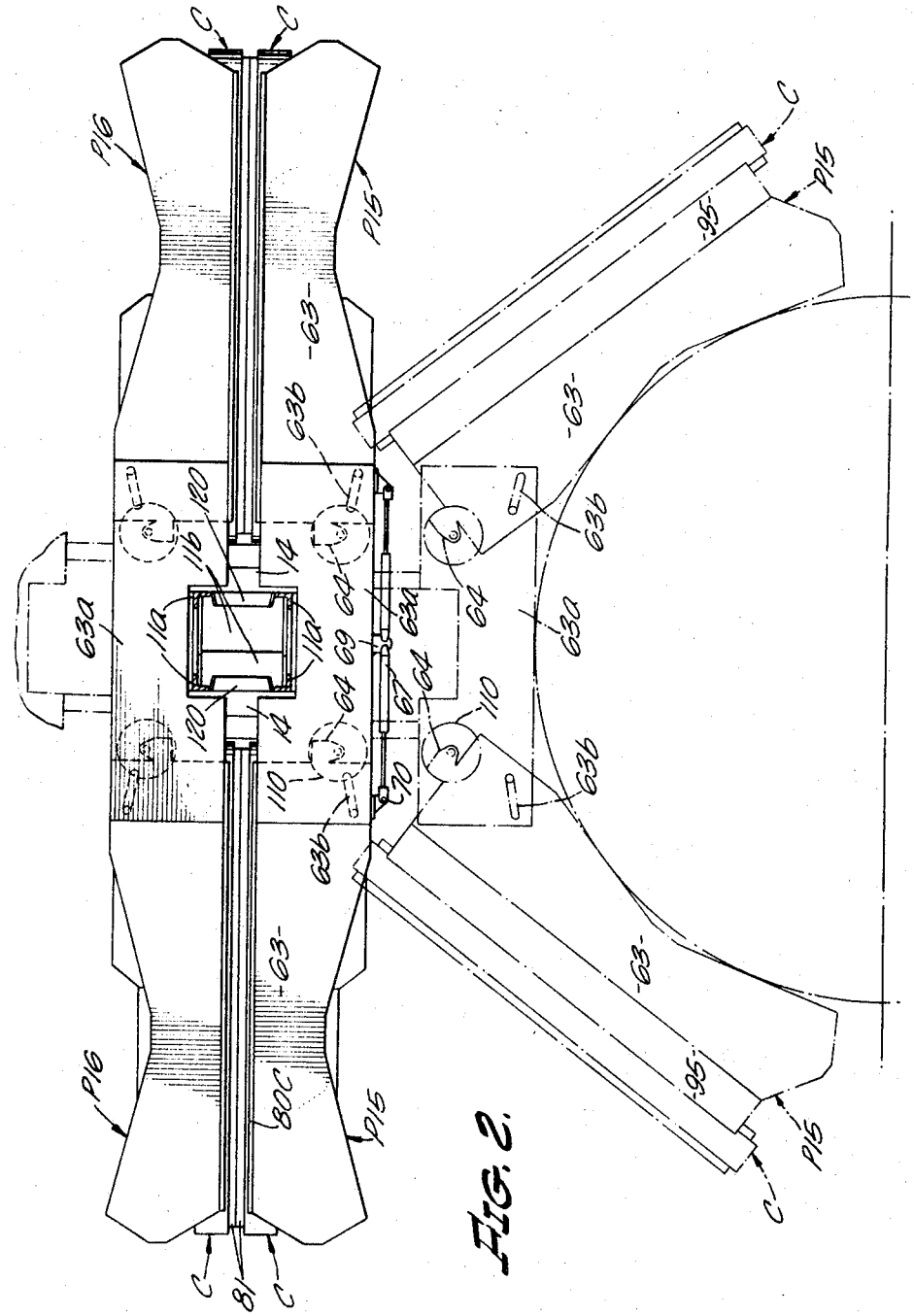

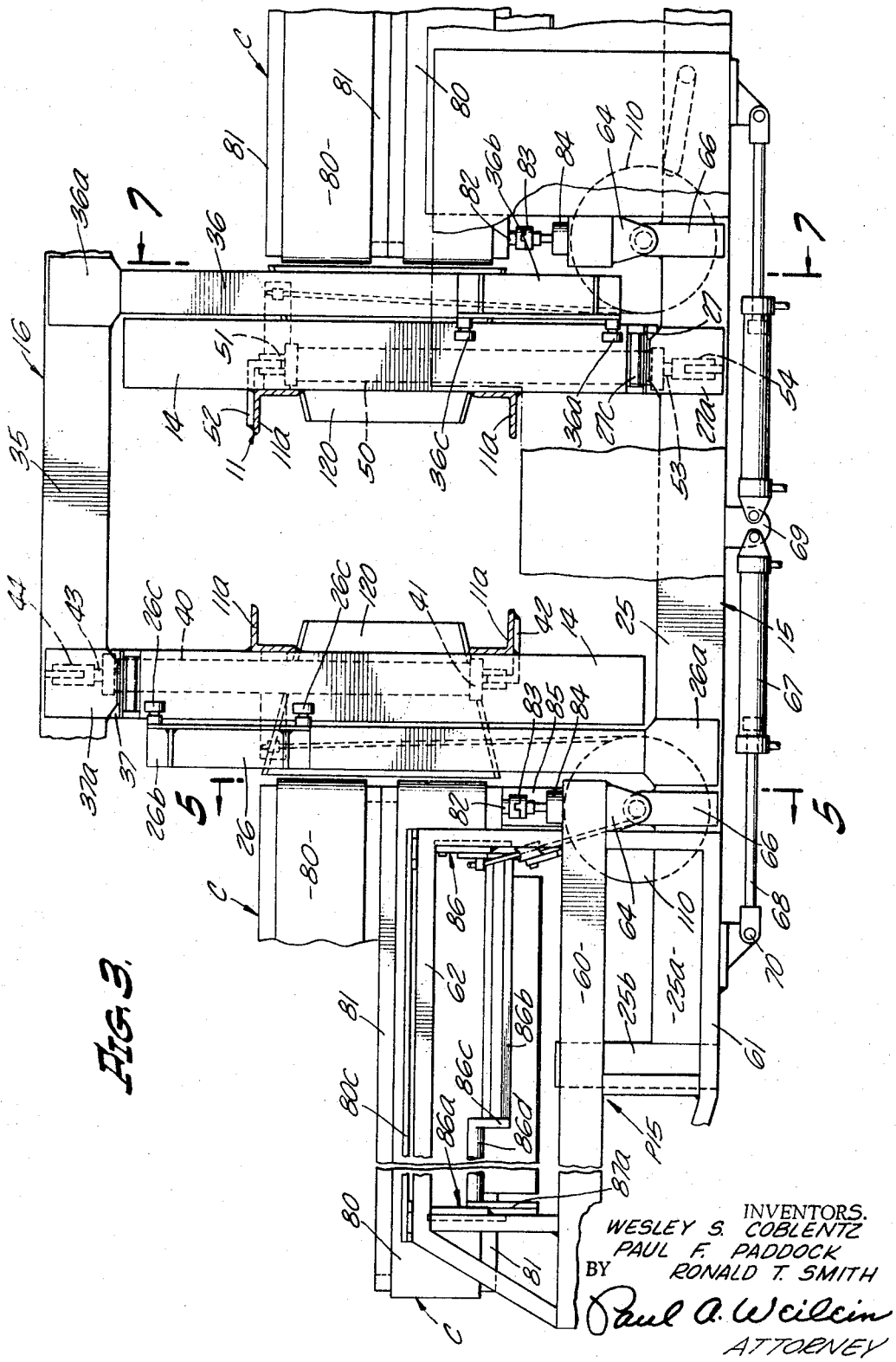

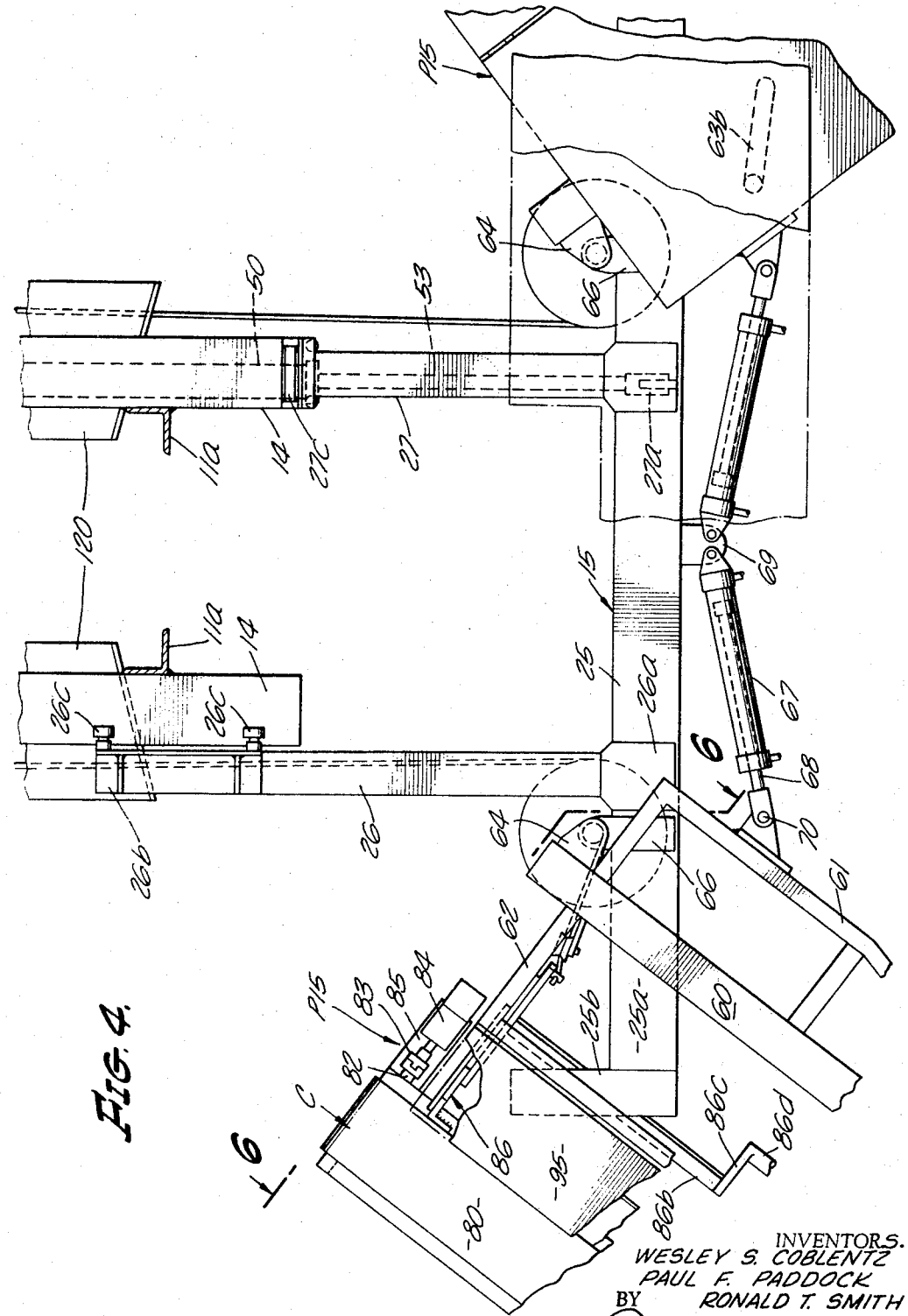

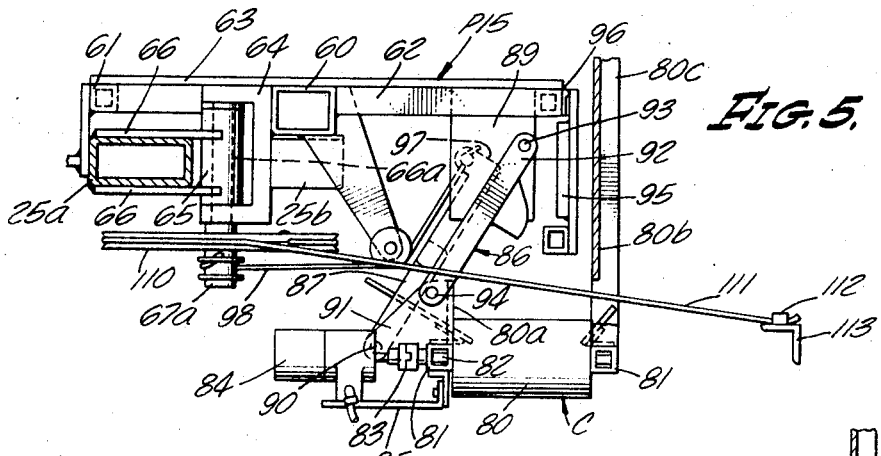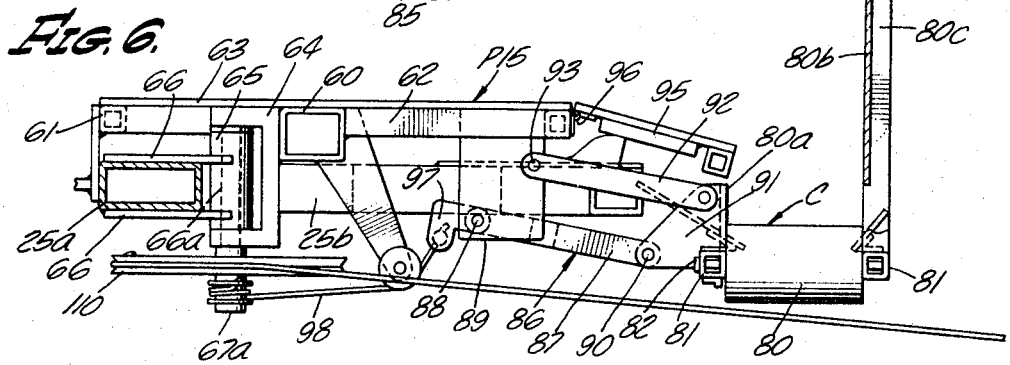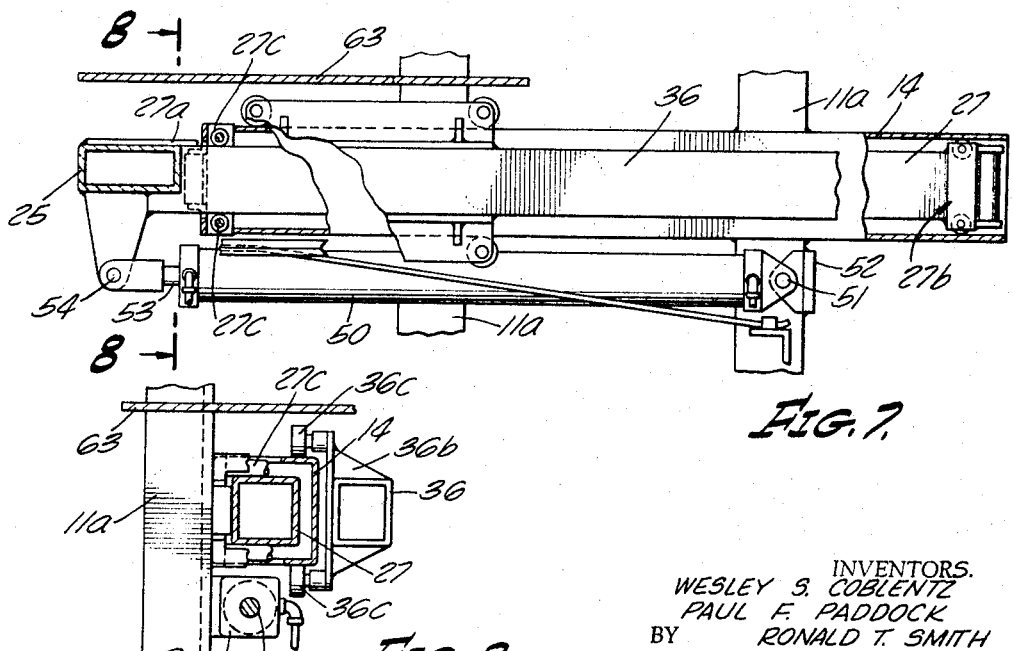

United States Patent Office 3,437,174
Patented Apr. 8, 1969

3,437,174
MOBILE PLATFORM CONSTRUCTION
Wesley S. Coblentz, Woodland, Paul F. Paddock, Riverside, and Ronald T. Smith, Ontario, Calif., assignors to Sunkist Growers, Inc., Los Angeles, Calif., a corporation of California
Filed Nov. 10, 1966, Ser. No. 593,481
Int. Cl. E06c 1/00, 5/00; E04g 3/16
U.S. Cl. 182—16                                    30 Claims

ABSTRACT OF THE DISCLOSURE

Mobile platform apparatus for harvesting fruit from trees, in which a vertical tower is carried by a vehicle, a receptacle being supported on the vehicle bed near the tower, worker platforms being supported on the tower for movement in horizontal planes to retracted positions and extended positions adjacent a tree, the platforms having means for adjusting to different work positions, conveyor means extending along the platforms for collecting picked fruit and conveying it to the discharge position within the receptacle, a decelerator having a series of webs which define a tortuous path for preventing damage to the fruit as it falls or gravitates into the receptacle, and including a ramp at the leading end of the vehicle bed for facilitating the placement of an empty box on the bed for movement to a filling location, and to a pickup location at the trailing end of the vehicle bed.

---

The present invention relates to apparatus useful in the picking of fruit such as citrus fruit and more particularly to a mobile platform construction adapted to travel between rows of fruit trees and to support workers in positions at which such workers may more readily clip or pick fruit from various regions of the fruit trees.

One of the common practices employed in the harvesting of crops of fruit from fruit trees and more particularly in the harvesting of citrus fruit crops, is the clipping of individual fruit or the snapping of fruit from the tree by crews of pickers. These pickers carry sacks and ladders which are employed to enable the pickers to reach the higher levels of the respective trees while other pickers remove the fruit from the lower levels of the trees. As the fruit is gathered in the sacks by the pickers, the sacks are periodically dumped into boxes disposed strategically along the rows of trees being picked. Filled boxes are then moved by the forklift or other vehicle to a position at which the fruit may be conveniently picked up by a transport vehicle.

The present invention has as an object the provision of means including a travelling support for a box, together with movable platforms from which the pickers may work at various positions on a horizontal plane relative to the trees and at different elevations along the rows of trees, thereby substantially enhancing the ability of the pickers to rapidly pick the bulk of the fruit from the respective trees with comparative ease.

In accomplishing the foregoing general objective, it is a more specific object of the invention to provide a mobile support having a plurality of horizontally extended platforms pivotally mounted for swinging movement in a horizontal plane so as to be moved between retracted positions, at which the support and the platforms may be moved longitudinally between rows of trees, and extended positions, at which the platforms are disposed in close relationship to or virtually squeeze the trees and extend angularly about the trees so as to essentially embrace one-half of a tree, thereby providing a generally arcuate platform on which the pickers may move, and the pickers having access to the inner regions of the trees.

Another object is to provide such a combined support and movable platforms wherein the platforms are disposed at different elevations so as to allow pickers to simultaneously work in zones of different elevation.

Still another object of the invention is to provide means associated with the platforms whereby picked fruit may be rapidly and easily deposited in positions closely adjacent the location at which such fruit are picked and the fruit will thereafter be conveyed to a discharge location so as to be deposited within the box carried by the mobile support.

Still another object is to provide such a mobile support and platform apparatus wherein means are provided for decelerating the fall of fruit into the box so as to prevent damage of the fruit, particularly such fruit as is dropped into the box from the higher elevations.

Yet another object of the invention is to provide decelerating means useful for retarding the fall of articles which might otherwise be damaged when such articles are dropped into a receptacle, such decelerating means including a series of webs defining a tortuous path for the articles as they gravitate through the webs and such decelerating means also including a support therefor which allows the decelerating means to be shifted to progressively higher elevations within the box as the box is progressively filled.

A further object of the invention is to provide a mobile platform of the general type referred to above which is steerable to facilitate its being maneuvered through rows of trees by means of a steerable forklift truck or the like, and wherein the hydraulic power system of the forklift truck may be employed as a source of power fluid for actuating the platforms to extended and retracted positions, the forklift truck being free to perform other work while the platforms are projected, and the platform construction being such that the fruit boxes may be handled in a continuous or line type fashion.

In respect of continuous or line type handling of boxes, it has heretofore been a problem in the harvesting of fruit and the like that the empty boxes and the filled boxes need be strategically located so that they may be handled both when empty and filled without obstructing the passage of a mobile support between rows of trees. Accordingly, an object of the present invention is to provide mobile platform apparatus in accordance with the foregoing which enables the placement of empty boxes in spaced locations along the space between tree rows and which facilitates the successive filling of the boxes, the filled boxes being moved from the platform to a local pickup location while the picking progresses.

Other objects and advantages of the invention will be hereinafter described or will become apparent to those skilled in the art, and the novel features of the invention will be defined in the appended claims.

In the accompanying drawings:

FIG. 1 is a view in side elevation illustrating a mobile platform construction made in accordance with the invention including a fragmentary side elevational showing of a forklift truck useful in moving the platform construction and supplying motor fluid to the mechanism for operating the platforms;

FIG. 2 is a top plan view with a portion of the tower frame broken away and in section as taken on the line 2—2 of FIG. 1 and showing a pair of the platforms in broken lines moved to a projected position so as to extend angularly about a tree;

FIG. 3 is an enlarged fragmentary view in horizontal section as taken on the line 3—3 of FIG. 1 and showing the platform support structure with the platforms in retracted positions;

FIG. 4 is a view generally corresponding to FIG. 3 but showing the platform in the projected positions;

FIG. 5 is a fragmentary vertical sectional view as taken on the line 5—5 of FIG. 3;

FIG. 6 is a fragmentary vertical sectional view as taken on the line 6—6 of FIG. 4;

FIG. 7 is an enlarged fragmentary sectional view as taken on the line 7—7 of FIG. 3;

FIG. 8 is a fragmentary detail view in section as taken on the line 8—8 of FIG. 7;

FIG. 9 is a fragmentary view in side elevation with certain of the parts broken away and more particularly illustrating the decelerating means of the invention, the decelerating means being shown in an elevated position in full lines and being shown in broken lines in a lowered position within a box;

FIG. 10 is a fragmentary view in perspective illustrating the decelerating means and operating support therefor; and FIG. 11 is a fragmentary detail view partly in section and partly in elevation showing in detail the operating means for the decelerating means.

Like reference characters in the several views of the drawings and in the following description designate corresponding parts.

Referring to FIG. 1, the present invention is illustrated as comprising a travelling support or vehicle generally denoted at 1 having at opposite ends of a longitudinally extended bed 2 steerable wheel assemblies 3 and 4 respectively pivotally connected to the bed as at 5 and 6. The wheel assembly 3 is locked in alignment with the bed 2 by suitable means such as a bolt 7, while the wheel assembly 4 is illustrated as free for angular movement beneath the bed 2.

Centrally of the bed there is an upstanding box frame structure 8 composed of suitable structural members 9 and braces 10, the members 9 being spaced apart so as to enable the disposition therebetween of a box B. Rigidly supported by and projecting upwardly from the box frame 8 is a tower frame 11 composed of suitable structural members such as angle irons 11a joined to the box frame 8 at the lower end and interconnected by horizontal frame elements 12 at the top of the tower.

Suitably secured to the angle irons 11a at a lower elevation is a pair of tubular supports 13, illustrated specifically as rectangular hollow members which are located on a common plane, extend transversely of the tower 11, and provide for transverse rigidity of the tower, the supports 13 being welded to the angle irons 11a in the illustrative embodiment. Located on a plane above the tubular supports 13 is another pair of tubular supports 14 which are also welded or otherwise suitably secured to the angle irons 11a of the tower 11 on a common plane, and which extend transversely as best seen in FIG. 3.

Carried by the tower 11 and more particularly by the respective tubular supports 13 and 14 are pairs of T-frames generally denoted at 15 and 16. These T-frames 15 and 16 support upper and lower sets of picker's platforms including four platforms on one side of the tower respectively designated P15 as well as four platforms on the other side of the tower, the upper two of which are shown in FIG. 2 and are designated P16.

As contemplated by the present invention, the travelling support 1 is adapted to be moved longitudinally between rows of trees with the platforms P15 and P16 disposed in retracted positions as shown in full lines in FIG. 2. At selected locations along the tree row, adjacent a tree to be picked, the platforms are adapted to be projected outwardly and to be pivoted as shown in broken lines in FIG. 2 into positions at which they closely embrace a side of the tree, so as to enable the picker to move with facility about substantially one-half of the tree and at the elevation at which the platforms are disposed. Inasmuch as platforms are disposed at multiple elevations, it will be appreciated that a number of pickers may expeditiously remove the vast majority of the fruit from the tree while other pickers, if necessary, can work from ground level.

As will be hereinafter more fully described, the picked fruit is adapted to be deposited by the pickers substantially at any location in which they may find themselves along the length of the platforms, on means which will ultimately convey the picked fruit to the tower 11. Thereafter, the picked fruit will fall through the tower, descent thereof being decelerated by means of baffle walls 11b spaced vertically in the tower 11 and thence the fruit will pass through adjustable decelerator means generally denoted at D into the box B. When the box B is filled, workers may slide the same longitudinally of the bed 2 to the position shown in broken lines and an empty box B may be moved into position within the box frame 8 below the tower 11.

Also illustrated and generally denoted at F is a fork lift truck having a fork F' adapted, as shown in the broken line position of FIG. 1, to engage the fruit box, also shown in broken lines, to remove the same from the travelling support and transport the filled box to a convenient location for ultimate collection of the fruit. When the fork F' is in the position shown in full lines in FIG. 1, it is adapted to engage with the steerable wheel assembly 4 so that the worklift truck F may be employed to move the travelling support 2 and to steer the same when it is desired to cause movement of the assembly along the tree rows. Thus, the wheel assembly 4 is provided with a socket 4' providing means for enabling connection of the forklift truck to these steerable wheels.

The forklift truck F is provided with a hydraulic hose 20 having a coupling 21 adapted for conection with a coupling 22 carried by a valve box 23, this valve box being supported on a frame 23' adjacent the end of the travelling support bed. Thus, hydraulic fluid derived from the usual power fluid source of the forklift truck may be employed to supply fluid under pressure to the various actuator means whereby the platforms P15 and P16 are to be laterally projected and retracted as well as caused to swing about pivotal mountings between the full line and broken line positions of FIG. 2. The valve box 23 is provided with a suitable bank of valves 24 adapted to be manually operated to effect the desired control of the platforms P15 and P16.

Referring more particularly to FIGS. 3, 7 and 8, the upper transversely extended tubular support members 14 and the T-frames 15 and 16 are shown in detail. These T-frames are identical assemblages turned end for end. The T-frame 15 is shown as comprising a longitudinally extended beam 25 which in longitudinally spaced relation thereto and rigidly connected therewith has a horizontally extended support arm 26 and a support arm 27 respectively connected to the beam 25 at 26a and 27a by gussets welded to the beam 25 and to the respective support arm. The support arm 26 has at its outer free end a support 26b having pairs of rollers 26c spaced longitudinally of the support arm 26 and adapted to ride upon the upper surface of the support 14. A similar pair of rollers, not shown, are adapted to engage beneath the support 14 for purposes of stability.

The support arm 27 extends into the other support 14 in telescopic relation and includes at its outer end and disposed within the support 14 a roller assembly 27b. In addition, the last mentioned support member 14 has rollers 27c engageable with the support arm 27 to facilitate telescopic movement of the latter in the support 14.

Similarly, the T-frame 16 has a support arm 36 corresponding to the support arm 26 of T-frame 16 and connected as at 36a to the beam 35. At its outer end the support 36 has a roller support 36b and rollers 36c riding on the top and bottom surfaces of the adjacent support 14. In addition, the beam 35 has a support arm 37 mounted on the beam 35 as at 37a and telescopically disposed in the support member 14 on which support arm 26 of T-frame 15 is shiftably mounted by the rollers 26c referred to above.

Thus, it is apparent that the two T-frames are essentially identical and are turned end for end so as to be respectively mounted upon the transverse supports 14 for inward and outward movement relative to the tower 11.

Means are provided for effecting relative movement of the respective T-frames on the supports 14 whereby, as will be hereinafter described, to move the platforms P15 and P16 outwardly to desired locations adjacent a tree. As seen in FIGS. 3, 4, 7 and 8, the means for effecting such movement of the T-frames 15 and 16 typically comprises a fluid pressure operated actuator cylinder 40 anchored at one end as 41 to a bracket 42 which is in turn welded or otherwise suitably secured to one of the angle irons 11a of the tower 11, the actuator cylinder 40 having its rod 43 connected as at 44 to the beam 35 of the T-frame 16 (FIG. 3). Correspondingly, a second actuator cylinder 50 is connected as at 51 to a bracket 52 which is welded or otherwise suitably secured to one of the angle irons 11a of the tower 11, this cylinder 50 having its rod 53 connected as at 54 to the beam 25 of the T-frame 15 (FIGS. 3 and 7).

Thus, fluid under pressure supplied to actuator cylinder 40 will cause the beam 35 of T-frame 16 to be moved outwardly, the support arms 36 and 37 of the latter travelling along and in the supports 14 respectively. Likewise, as seen in FIG. 4 to best advantage, fluid pressure supplied to the actuator cylinder 50 will cause the beam 25 of the T-frame 15 to be moved outwardly, the support arms 26 and 27 travelling along and in the respective supports 14.

As previously indicated, the T-frames 15 and 16 support the platforms P15 and P16 for pivotal movement between the full line positions and the broken line positions shown in FIG. 2 and each of the platforms provides an area on which a packer may move about the tree as he picks the fruit therefrom. A typical platform and its relationship to the T-frame is illustrated in FIGS. 3–6. As shown in these views of the drawing the T-frame beam 25 of T-frame 15 has an endwise extension 25a which projects beyond the support arm 26, this extension 25a having a laterally offset brace 25b. A platform P15 shown in these views of the drawings comprises an elongated platform beam 60 slidable upon the upper surface of the end extension 25a and the brace 25b of the T-frame beam 25.

Projecting outwardly from one side of the beam 60 is a framework 61 and projecting outwardly from the other side of the beam 60 is a framework 62. Overlying the beam 60 and the laterally projecting frameworks 61 and 62 is a plate 63 which constitutes a tread on which the worker may walk. Referring to FIG. 2, it will be noted that the tread 63 is centrally indented to accommodate the contour of the tree so that the platform may be moved into close proximity to the tree without damage to the branches thereof.

The beam 60 is pivotally connected to the T-frame beam 25 by means of a yoke 64 welded or otherwise suitably connected to the inner end of the beam 60 and pivotally mounted on a bushing 65 which is in turn supported on the beam 25 by suitably welded gussets 66. A pivot pin 66a extends through the bushing 65.

In order to effect pivotal movement of the platform, actuator means are provided in the illustrative form of a fluid pressure operated cylinder 67 having a rod 68, the cylinder being connected to a bracket 69 projecting from the beam 25 and the rod 68 being connected as at 70 to the framework 61. The cylinder 67 is of the double acting type so that when the rod 68 is drawn into the cylinder 67 the beam 60 will be pivoted from the position shown in FIG. 3 to that shown in FIG. 4 and the beam 60 during such pivotal movement will slide upon the upper surfaces of end extension 25a and lateral brace 25b of the beam 25.

Each of the platforms also comprises conveyor means generally denoted C which are adapted to convey picked fruit from locations along the platform to the tower, such conveyor means being retractable to a location beneath the platform assembly when the platform is in the retracted position shown in FIG. 3, but the conveyor means being extensible when the platform is swung outwardly. The retracted and extended positions of the conveyor means C are typically illustrated in FIGS. 5 and 6, respectively, as well as in FIGS. 2–4, and retraction of the conveyor means C enables movement of the platforms P15 and P16 into closely adjacent relationship so that the platforms will occupy a narrow region extended longitudinally between the rows of trees when the platforms are retracted.

Each of the respective conveyor means C comprises endless conveyor means 80 extended longitudinally of the platforms and supported for endless travel between a pair of parallel and longitudinally extended supports 81. At the inner end of each of the conveyors 80, that is, at the end of the conveyor adjacent the tower support 11, the conveyor is adapted to be driven in its endless path by means of a driven shaft 82 mounted in the supports 81 (FIG. 5) and coupled as at 83 to the output shaft of a motor 84. Motor 84 is preferably of the hydraulic type and is provided with suitable hose connections with a source of motor fluid under pressure. It will be noted that the motor 84 of the respective conveyors is supported upon a bracket 85 which is in turn connected to the adjacent support 81 for the conveyor.

The entire conveyor assembly comprising the endless conveyor 80 and the motor therefor is suspended beneath the respective platforms by a parallel link mechanism generally denoted at 86 which supports the conveyor means for movement between the retracted position shown in FIG. 5 at which the conveyor means is disposed beneath the platform to the outwardly extended position shown in FIG. 6 at which the conveyor means is in position for the reception of fruit as it is being picked from the tree by the worker standing on the platform tread 63. This parallel link mechanism 86 includes an operating link 87 which is pivotally supported as at 88 to a depending support plate 89 carried by the inwardly projecting framework 62 carried by the platform beam 60.

An end of the actuator link 87 is pivotally connected as at 90 to a plate 91 which is suitably affixed to the inner support 81 of the conveyor means C. In parallel relation to the actuator link 87 is a stabilizer link 92 which is also pivotally connected to the support plate 89 as at 93 and to the plate 91 as at 94. Stabilizer link 92 also constitutes means incorporated in the conveyor supporting linkage 86 for moving from a vertical hanging position as shown in FIG. 5, to a slightly inclined position as shown in FIG. 6, an elongate member 95 which is pivoted to the framework 62 as at 96 and which when the conveyor C is in the outwardly extended position shown in FIG. 6 serves as a baffle to prevent the entry of picked fruit into the gap formed between the platform tread 63 and the endless conveyor 80. Conveyor supporting linkage 86 also includes on the actuator link 87 a lever arm 97 by which the actuator link 87 is adapted to be pivoted about its pivotal connection 88 to effect the extension and allow the movement of the conveyor means C to the retracted position.

In order to equalize the load on the parallel linkage means 86, another parallel linkage means 86a is provided adjacent the outer end of the framework 62 carried by the platform beam 60 as best seen in FIGS. 1 and 3. In order to effect simultaneous operation of the parallel linkage mechanisms 86 and 86a, the actuator link 87 of linkage 86 has connected thereto a bar 86b which is connected to a crank arm 86c, the latter in turn being connected to a bar 86d extending outwardly and connected to the actuator link 87a of the parallel linkage mechanism 86a. Thus, each of the parallel linkages 86 and 86a will operate in unison to cause outward projection of the conveyor means C when the platform is pivoted outwardly relative to the platform beam 25 or 35, as the case may be.

Means are provided for operating the actuator link 87 and more particularly such means is, in the illustrative embodiment, adapted to be operated in response to outward movement of the T-frame. In this connection, it will be noted that the therein illustrated pivot pin 66a has a downward extension 67a. Engaged with the downward extension 67a of the pin 66a is a flexible cable 98 having a number of turns about the downward pin extension 67a at one end and connected as at 99 to the lever arm 97 of actuator link 87. Thus, when pivot pin 66a revolves in one direction, the cable 98 will be wound about the downward pin extension 67a imposing an actuating force on the lever arm 97 to cause outward extension of the conveyor means C. Preferably, cable 98 engages an idler roller 100 mounted on a support arm 101 which is in turn carried by the platform beam 60.

Means are provided for causing rotation of pin 66a of the respective platforms automatically in response to outward movement of the respective T-frames 15 and 16. For example, as shown in FIGS. 5 and 6, it will be noted that the pivot pin 66a on its lower end 67a has a sheave 110 suitably fixed thereon so that rotation of the sheave will effect rotation of the pin 66a. In order to cause rotation of the pin 66a a cable 111 has an end wrapped about the sheave 110 and connected to the latter, the other end of the cable 111 being connected as at 112 to an angle iron member 113 or other suitable member which is connected to a stationary part of the apparatus such as the tower frame 11.

It will now be understood that when the actuator cylinders cause outward projection of the T-frame beam 25 as previously described, the sheave 110 will be caused to rotate as the cable 111 is pulled therefrom. Such rotation of the sheave will cause rotation of the pin 66a to swing the platform outwardly and wind the cable 98 on the end extension 67a so as to simultaneously cause outward projection of the conveyor means.

Thus, as the mobile support is moved into position adjacent the tree to be picked, the platforms P15 and P16 may be moved outwardly relative to the tower support 11 and automatically the platforms will be swung into positions in proximity to adjacent quadrants of the tree and the conveyor means will be projected outwardly. At this time a worker may pick all of the fruit within his reach as he moves along the platform treads 63 and such picked fruit may simply be dropped to his rear onto the endless conveyors 80. In order to prevent such fruit from rolling off of the conveyors 80, there is preferably an inside baffle wall 80a and an outside baffle wall 80b extended longitudinally of the respective conveyors. In addition, the baffle wall 80b may have projections projecting substantially upward and providing a railing 80c affording a degree of safety to the worker.

When the platforms are moved inwardly toward one another and away from the tree, it will be understood that the conveyors 80 will assume the retracted position shown in FIG. 5. At this time the motor 84 may be operated to drive the conveyor whereby to carry the fruit thereon toward the support tower 11.

The support tower 11, as best seen in FIGS. 1 and 3, is provided with chutes 120 onto which the conveyors 80 will discharge fruit during operation of the motors 84. The chutes lead into the center of the tower 11 so that the fruit will fall through the tower, the descent of the fruit being decelerated by the baffles 11b.

Referring more particularly to FIGS. 1 and 2, it will be noted that there is disposed between adjacent ends of the respective pairs of platforms P15 and P16 a bridging tread plate 63a which rests upon the upper surfaces of treads 63 and bridges the gap between platforms. For the sake of simplicity, the bridging treads 63a and the underlying portions of treads 63 are provided with suitable pin and angularly disposed slot means 63b whereby the relative angular movement therebetween is permitted as the platforms pivot outwardly relative to the bridging treads 63. Moreover, the pin and slot means 63b is preferably arranged so as to cause further outward movement of tread 63 as the platforms P15 and P16 swing towards the tree, thus enhancing the squeezing of the tree by all of the platform elements. In addition, it will be noted in FIG. 1 that if desired the tower support 11 may be provided with additional chutes 121 into which fruit may be dropped by a worker as he stands upon the bridging treads 63a. Thus, all fruit picked from the platforms ultimately is deposited into the tower and will fall downwardly toward the box B.

Supported by the box frame structure 8, as previously indicated, is the decelerating means D which is best illustrated in FIGS. 9–11 and which is adapted to be lowered into the box B and progressively elevated as the box is filled while serving to cushion downward movement of the fruit into the box.

The box frame 8 includes vertical frame members 8a and horizontal frame members 8b on which are supported the angle irons 11a of the tower frame 11. The decelerating means D is disposed between the vertical frame members 8a in the path of fruit passing downwardly through the tower 11. More particularly, the decelerating means D comprises a pair of open frames 130 and 131 of generally rectangular form which are normally held in vertically spaced relation by coil springs 132 which are interposed between outstanding ears 133 on frame 130 and 134 on frame 131. The frames 130 and 131 are suspended by means of flexible cables 135 connected at their lower extremities to the ears 134 of frame 131 and extended through openings 136 in the ears 133 on the frame 130. These cables 135 are wrapped a number of turns about horizontally extended shafts 137 which are journalled in bearing supports 138 depending from the horizontal frame members 8b.

Means are provided for simultaneously driving the shafts 137 so as to elevate or lower the decelerator frames 130 and 131. Such means is in the illustrative embodiment comprises sprockets 139 on the shafts 137 and a drive chain 140 extended about the sprockets. A crank 141 is provided on one of the shafts 137 to cause rotation of the same with resultant rotation of both of the shafts 137 whereby the cables 135 will raise or lower the frames 130 and 131.

Each of the frames 130 and 131 is provided with a series of laterally spaced webs of flexible fabric or other material which form a tortuous path and which will be engaged by falling fruit to arrest downward movement of the fruit without causing injury thereto. Frame 130 has upper webs 130a extended across the frame in parallel relation and between webs 130a and spaced downwardly from the plane of the latter is a set of parallel transversely spaced webs 130b. These webs 130b are each stretched between brackets 130c depending from opposite sides of the frame 130. The arrangement of the webs 130a and 130b is such that the latter are disposed beneath the spaces defined by the former. Thus, as seen in FIG. 9, a fruit encountering one of the webs 130a will have its downward movement arrested and it will then pass between adjacent webs 130a into engagement with a web 130b.

The lower frame 131 has a set of upper webs 131a spaced in parallel relation and a lower set of webs 131b disposed in the spaces between the webs 131a, the webs 131a being stretched between upstanding brackets 131c. Therefore, as fruit falls from a web 130b of the frame 130 it will encounter a web 131a and thence must pass between webs 131a and will engage a lower web 131b prior to falling therefrom into the box B. As the box is progressively filled with fruit the crank 141 may be operated to cause progressive elevation of the decelerating means to the desired level above the fruit in the box.

Ultimately, as shown in FIG. 9, the upper frame 130 will engage suitable stop projections 8c on the horizontal frame members 8b so that further upward movement of the decelerating means frame 130 will be halted but the lower frame 131 will continue to move upwardly causing compression of springs 132 as the brackets 131 and webs 131a nest between brackets 130c and webs 130b, thus affording clearance for removal of a filled box.

From the foregoing, it will be recognized that the present invention provides a mobile platform apparatus which may be conveniently moved between rows of trees in a groove and forward motion may be stopped at a location adjacent a selected tree at which the platforms P15 and P16 may be moved outwardly and pivoted relative to the tree so that a worker supported upon the platform may move with facility about substantially a semi-circular region of the tree removing the fruit therefrom within his reach. In the event that the apparatus is provided with multiple levels of platforms as in the illustrative embodiment, workers may simultaneously pick fruit from the multiple tree levels while other workers pick those fruit near the ground level.

Moreover, as the workers remove the fruit from a tree and deposit the same on the conveyor means C, the forklift vehicle F may conveniently be employed for transporting a filled box B to a location at which the fruit from that box may be picked up for further transport. Upon returning to the location of the travelling support the forklift vehicle F may engage the fork F' thereof in the recesses 4' of the bed 2 of the travelling support and the hydraulic connection between the source of fluid on the forklift vehicle and the travelling support may be made.

Thereafter, after picking of the fruit by the workers on the various platforms has been completed, the valves 24 may be operated so as to effect retraction of the T-frames 25 and 35 by the cylinders 40 and 50 and the cylinders 67 may be operated to cause pivotal movement of the platforms 14 and 15 to the retracted positions shown in full lines in FIG. 2. During the course of the latter operation it will be understood that the conveyor means C will gravitate from the projected position shown in FIG. 6 to the position shown in FIG. 5. Then the hydraulic power fluid derived from the forklift vehicle may be employed to operate drive motors 84 so as to cause operation of the endless conveyor 80. The fruit on the conveyor 80 will be dumped from the conveyors 80 onto the chutes 120 so as to gravitate to the tower 11, downward movement of the fruit being decelerated by the baffles 11b as the fruit falls through the tower. Ultimately, downward movement of the fruit will be decelerated by the decelerating means D.

Referring now to FIG. 1, it will be observed that the mobile platform apparatus described above facilitates the continuous or line handling of boxes B. In this connection, the leading wheel support 3, as previously described, is fixed while the wheel support 4 is steerable by the forklift truck F. At the leading end of the vehicle 1 and suitably connected thereto is a ramp designated 1a having suitable wheels 1b which will precede the vehicle 1 as it moves longitudinally between rows of trees. Upon approaching an empty box placed between the rows of trees, the empty box B may be conveniently moved up the ramp 1a and along the vehicle bed 2 to a fruit receiving position within the box frame structure 8. A previously filled box, as shown in FIG. 1, may be moved to the rear of the bed 2 so as to be picked up by the forklift truck and transported to a pickup area convenient to a road so that the filled box may be placed upon a transport truck. Thus, it will be apparent that in the continuous or line fashion the mobile platform apparatus may move longitudinally between tree rows and progressively the empty boxes may be moved into fruit receiving position, filled, and then removed from the bed, thus requiring a minimum of box handling. Indeed, the forklift truck which constitutes in the illustrative embodiment the means for moving the platform vehicle 1 is also employed for removing the filled boxes, thus further enhancing the handling of the boxes.

While specific structural details have been shown and described, it should be understood that changes and alterations may be resorted to without departing from the spirit of the invention as defined in the appended claims.

We claim:

1. Mobile platform apparatus for use in harvesting fruit and the like from trees, comprising: a mobile vehicle having a bed; a vertical support tower extending above said bed; said bed having a region adjacent said support tower for supporting a receptacle; horizontally extended elongate platform means providing working areas between the ends thereof for a plurality of pickers; means mounting said platform means at the inner end thereof on said support tower for movement of said platform means in a horizontal plane relative to said support between a retracted position and an extended position closely adjacent a tree; operating means for moving said platform means between said positions; and said platform means including conveying means extending longitudinally thereof for receiving fruit and discharging said fruit at a location above said receptacle.

2. Mobile platform apparatus as defined in claim 1, wherein said means mounting said platform means comprises a horizontally shiftable frame carried by said support tower; said platform means being carried by said frame; and said operating means includes means acting on said frame to move the same relative to said support tower.

3. Mobile platform apparatus as defined in claim 2, wherein said support tower is provided with at least a pair of horizontally extended tubular members; said frame having a pair of arms shiftably carried by said tubular members.

4. Mobile platform apparatus as defined in claim 2, wherein said means mounting said platform means also comprises means pivotally mounting said platform means on said frame adjacent said support tower.

5. Mobile platform apparatus as defined in claim 2, wherein said means mounting said platform means also comprises means pivotally mounting said platform means on said frame adjacent said support tower; and said operating means also includes means for effecting pivotal movement of said platform means relative to said frame.

6. Mobile platform apparatus as defined in claim 1, wherein said platform means comprises at least a pair of platforms respectively mounted at opposite sides of said support tower; each of said platforms having a tread thereon; and in intermediate tread spanning said treads of each of said platforms.

7. Mobile platform apparatus as defined in claim 1, wherein said platform means comprises at least a pair of platforms respectively mounted at opposite sides of said support tower; each of said platforms having a tread thereon; an intermediate tread spanning said treads of each of said platforms; and said means mounting said platform means comprising means pivotally supporting said platforms at adjacent ends thereof; said intermediate tread being shiftably connected to the respective treads of said platforms for enabling pivotal movement of said platforms.

8. Mobile platform apparatus as defined in claim 1, wherein said conveying means includes endless conveyor means extending lengthwise of said platform means; and including means pivotally supporting said conveyor means on said platform means for movement between positions extended outwardly along side said platform means and retracted beneath said platform means.

9. Mobile platform apparatus as defined in claim 1, wherein said conveying means includes endless conveyor means extending lengthwise of said platform means; including means pivotally supporting said conveyor means on said platform means for movement between positions extended outwardly alongside said platform means and retracted beneath said platform means; and including means for effecting movement of said conveyor means between said positions responsive to movement of said platform means between its retracted and extended positions.

10. Mobile platform apparatus as defined to claim 1, wherein said tower support is provided with means for decelerating the fall of fruit from said conveying means into said receptacle.

11. Mobile platform apparatus as defined in claim 10, wherein said decelerating means comprises horizontally disposed frame means having webs disposed in staggered relation forming a tortuous fruit path therebetween.

12. Mobile platform apparatus as defined in claim 10, wherein said decelerating means comprises a pair of horizontally disposed frames disposed one above the other; means suspending the other of said frames beneath said tower support; means resiliently supporting said one of said frames above the other frame; said frames respectively having staggered webs thereacross forming tortuous fruit paths therebetween; and means for operating said suspending means for raising and lowering said frames out of and into a receptacle.

13. In combination, mobile platform apparatus for use in harvesting fruit and the like from trees and means for effecting movement of said apparatus, said mobile platform apparatus comprising: a mobile vehicle having an elongated bed provided with steerable wheels at one end of said bed; a vertical support tower on said bed; said bed having a region adjacent said support tower for supporting a receptacle; horizontally extended platform means carried by said support tower and shiftable between retracted and extended positions respectively aligned with and above said bed and projecting outwardly from said bed closely adjacent a tree; operating means for moving said platform means between said positions including fluid pressure operated actuator means; control valve means supported on said bed adjacent said end provided with said steerable wheels; and said means for effecting movement of said apparatus comprising: a fork lift truck having a fork thereon; said steerable wheels having means engageable by said fork for enabling steering of said bed during movement of said mobile platform apparatus by said forklift truck; said forklift truck having a source of fluid pressure; and means for effecting a connection between said source and said control valve means for actuating said platform means in response to fluid pressure derived from said forklift truck fluid pressure source.

14. The combination of claim 13, wherein said platform means includes conveyor means for receiving fruit and discharging said fruit at a location above said receptacle; fruit operated motor means for driving said conveyor means; and said valve means connecting said motor means to said forklift truck fluid pressure source.

15. Mobile platform apparatus for use in harvesting fruit and the like from trees, comprising: a mobile vehicle having a longitudinally extended bed; a box frame on said bed providing within said box frame a space for a receptacle; a support tower extended vertically above said box frame; a pair of horizontally disposed support members carried by said support tower and extended transversely of said bed; a pair of T-frames respectively shiftably carried by said support members at opposite sides of said support tower; platform means carried by each of said T-frames at opposite sides of said support tower; means for shifting the respective T-frames inwardly and outwardly relative to said support tower to move said platform means between retracted positions extended longitudinally in overlying relation to said platform and outwardly extended positions adjacent a tree; and said platform means each including conveying means for receiving fruit and discharging said fruit at a location above said receptacle.

16. Mobile platform apparatus as defined in claim 15, wherein a second pair of support members is provided on said support tower above said first mentioned pair of support members; said second pair of support members also having supported thereby a pair of said T-frames having said platforms and said conveying means thereon.

17. Mobile platform apparatus as defined in claim 15, wherein means are provided pivotally mounting said platform means on said T-frames and including means for effecting pivotal movement of said platform means relative to said T-frame means.

18. Mobile platform apparatus as defined in claim 15, wherein said platform means respectively comprise a pair of platform assemblies extended longitudinally relative to said support tower; means pivotally connecting said platform assemblies to the respective T-frames at the end of said assemblies adjacent said support tower; actuator means for effecting pivotal movement of said platform assemblies relative to the T-frames between retracted positions with said platform assemblies aligned above said bed and outwardly projecting positions at which said platform assemblies extend angularly about a tree.

19. Mobile platform apparatus as defined in claim 15, wherein said conveying means of each of said platform means comprises an elongated endless conveyor and including means shiftably mounting said endless conveyor on its platform means for movement between positions retracted beneath its platform means and extended outwardly to one side of its platform means; and means for shifting said endless conveyor between said positions.

20. Mobile platform apparatus as defined in claim 15, wherein said conveying means of each of said platform means comprises an elongated endless conveyor and including means shiftably mounting said endless conveyor on its platform means for movement between positions retracted beneath its platform means and extended outwardly to one side of its platform means; means for shifting said endless conveyor between said positions, including linkage mechanism suspending said endless conveyor beneath its platform means; said linkage mechanism having an actuating link; and means operable responsive to outward shifting movement of said T-frames for actuating said actuating link of the respective endless conveyor to move the latter to said outwardly extended position.

21. Mobile platform apparatus as defined in claim 15, wherein means are provided pivotally mounting said platform means on said T-frames and including means for effecting pivotal movement of said platform means relative to said T-frames; said conveying means of each of said platform means comprising an elongated endless conveyor; linkage means including an actuating link shiftably mounting said endless conveyor on its platform means for movement between positions retracted beneath its platform means and extended outwardly to one side of its platform means; means for shifting said endless conveyor between said positions, including a first cable connected at one end to said actuating link; a second cable connected to said support tower at one end of said second cable; a pulley about which the other end of said second cable is disposed; said means pivotally mounting said platform means on said T-frames including a pivot pin on which said pulley is mounted; and said first cable having its other end wound upon said pivot pin.

22. Mobile platform apparatus as defined in claim 15, wherein said pair of T-frames are identical structures turned end for end and each including a pair of spaced support arms; and means slidably connecting said support arms of both of said T-frames to said support members.

23. Mobile platform apparatus as defined in claim 15, wherein said pair of T-frames are identical structures turned end for end and each including a pair of spaced support arms; and means slidably connecting said support arms of both of said T-frames to said support members, including a telescopic connection of one arm to one of said support members and a roller support carried by the other of said arms and shiftably engaged with the other of said support members.

24. Decelerating means for decelerating the fall of fruit or other articles subject to damage, comprising: a pair of frames; means supporting said frames in generally parallel vertically spaced relation; each of said frames having a plurality of transverse webs; the webs of one frame being disposed in staggered relation to the webs of the other frame.

25. Decelerating means as defined in claim 24, wherein the webs of each of said frames comprise a plurality of sets of webs; each set of webs being laterally displaced relative to the other set of webs to form a tortuous path therebetween.

26. Decelerating means as defined in claim 24, wherein the webs of each of said frames include outer webs and inner webs spaced laterally and inwardly from the outer webs, the inner webs of one of said frames being laterally spaced from the inner webs of the other frame to allow nesting of said inner webs of said frames; and said means supporting said frames in spaced relation being resiliently deformable to allow said nesting.

27. Decelerating means as defined in claim 24, wherein the webs of each of said frames include outer webs and inner webs spaced laterally and inwardly from the outer webs, the inner webs of one of said frames being laterally spaced from the inner webs of the other frame to allow nesting of said inner webs of said frames; said means supporting said frames in spaced relation being resiliently deformable to allow said nesting; and including operating means for effecting elevation and lowering of said frames.

28. Mobile platform apparatus for use in harvesting fruit and the like from trees growing in rows, comprising: a mobile vehicle having a bed; said bed having a box filling location thereon including means for supplying fruit to a box at said location; means at the leading end of said bed for facilitating the placement of an empty box on said bed for movement of said empty box to said filling location; and said bed having a box pickup location at its trailing end for reception of a filled box from said filling location.

29. Mobile platform apparatus as defined in claim 28, including means for moving said vehicle; said means comprising a forklift truck; said bed having steerable wheels at its trailing end and means cooperative with said forklift truck for effecting a steering connection between said steerable wheels and said forklift truck; said location for a filled box at said trailing end of said bed being adjacent said steerable wheels to enable engagement of said filled box by said forklift truck.

30. Mobile platform apparatus for use in harvesting fruit and the like from trees, comprising: a mobile vehicle having a bed; a fruit receiving receptacle carried by said bed; a frame structure extending above said bed; platform means on at least one side of said bed including elongate end platforms extending from an associated bridging platform suported on said frame structure and adapted to be positioned in close proximity to the side of a tree having fruit to be picked; means mounting the end platforms for swinging movements between retracted and extended positions and in the extended positions for moving the end platforms towards and away from each other in order to adjustably position the end platforms so as to squeezingly embrace sides of the tree on opposite sides of the bridging platform and provide with the bridging platform working areas for a plurality of pickers, the end platforms in retracted positions lying adjacent the sides of the vehicle bed as to enable unrestricted transport from one tree to another; and means for conveying picked fruit from said platforms to said receiving receptacle.

References Cited

UNITED STATES PATENTS

| 1,133,436 | 3/1915 | Gramling | 182—49 |
| 2,614,893 | 10/1952 | Merrill et al. | 214—83.1 |
| 3,197,178 | 7/1965 | Nietz | 182—63 |
| 3,258,142 | 6/1966 | Girardi | 214—83.1 |
| 3,273,667 | 9/1966 | Hiyama | 182—129 |
| 3,341,039 | 9/1967 | Cranage | 214—83.26 |
| 3,356,181 | 12/1967 | Granger | 182—63 |

REINALDO P. MACHADO, *Primary Examiner.*

U.S. Cl. X.R.

182—129, 131, 141; 214—83.1